US005363747A

United States Patent [19]

Clark et al.

[11] Patent Number: 5,363,747

[45] Date of Patent: Nov. 15, 1994

[54] PROCESSING VESSEL HAVING DISCHARGE METERING/MIXING AUGER

[75] Inventors: Robert A. Clark, Plainfield; Rory R. Puzon, Darien; James T. Wlodarczyk, Chicago, all of Ill.

[73] Assignee: Delaware Capital Formation, Inc., Wilmington, Del.

[21] Appl. No.: 139,611

[22] Filed: Oct. 20, 1993

Related U.S. Application Data

[63] Continuation of Ser. No. 27,125, Mar. 5, 1993, abandoned.

[51] Int. Cl.[5] ........................ A47J 27/14; B01F 15/02; B01F 15/06

[52] U.S. Cl. ........................ 99/348; 366/149; 366/186; 366/195; 366/196

[58] Field of Search ............... 366/149, 186, 195, 196, 366/50, 131, 184, 190; 99/348, 483, 484

[56] References Cited

U.S. PATENT DOCUMENTS

| | | | |
|---|---|---|---|
| 1,993,264 | 3/1935 | Duttweiler . | |
| 2,591,601 | 4/1952 | Peters et al. . | |
| 3,570,569 | 3/1971 | Hartley | 366/196 |
| 3,671,141 | 6/1972 | Kovacs . | |
| 3,739,710 | 6/1973 | Costa | 99/348 |
| 4,103,353 | 7/1978 | Dougherty . | |
| 4,199,266 | 4/1980 | Giusti | 99/348 |
| 4,341,474 | 7/1982 | Wheeler, Jr. et al. . | |
| 4,786,181 | 11/1988 | O'Brien . | |
| 4,844,619 | 7/1989 | Lesar | 366/186 |
| 4,994,223 | 2/1991 | Hestehave et al. . | |
| 5,052,874 | 10/1991 | Johanson . | |

*Primary Examiner*—Robert W. Jenkins
*Attorney, Agent, or Firm*—Welsh & Katz

[57] ABSTRACT

Apparatus for preparing a product by the controlled metering of additive constituents into a base constituent includes a processing vessel having mixing and heating and/or cooling capability to produce a base constituent for discharge into the metering stage of a metering/mixing auger assembly. The metering stage of the auger assembly includes a screw type auger surrounded by a heating or cooling jacket and is operative to convey product from the processing vessel at a uniform rate to an auger mixing stage wherein the auger has increased pitch and is exposed to an open trough through which one or more additive constituents can be metered into the base constituent for mixing therewith. The auger mixing stage accommodates expansion of the mixed constituents. The metering/mixing auger and trough assembly may be readily disassembled for cleaning without need for tools.

29 Claims, 3 Drawing Sheets

PROCESSING VESSEL HAVING DISCHARGE METERING/MIXING AUGER

This application is a continuation of application Ser. No. 08/027,125, filed Mar. 5, 1993, nown abandoned.

BACKGROUND OF THE INVENTION

The present invention relates generally to apparatus for processing products such as food and other products requiring heating or cooling and mixing, and more particularly to a processing vessel having a novel metering-/mixing auger assembly associated therewith.

In preparing many types of products, a relatively large batch of a base constituent is first prepared in a mixing vessel capable of heating or cooling the base constituent during mixing. The base batch is then removed from the vessel and one or additional constituents are mixed with the base batch to create desired characteristics in the final product, such as a particular taste or density characteristic. For example, in making certain food products, a base batch is first prepared in a cooking and mixing vessel, and thereafter removed and an additive, such as baking soda, is mixed with the base batch in a controlled manner so that liberated gas is entrained in the mixture to obtain a desired density or softness characteristic in the final product. When forming products in this manner, the apparatus and technique for introducing the additive constituent, such as baking soda in the case of food products, into the base constituent batch must be capable of precisely metering the additive into the base batch. The apparatus must also insure uniform mixing and accommodate expansion of the base batch in instances where the additive gasifies the mixture.

SUMMARY OF THE INVENTION

It is a general object of the present invention to provide an improved processing system which employs a processing vessel having a novel metering/mixing auger assembly operative to admix one or more additives with a base batch prepared in the vessel.

A more particular object of the present invention is to provide a novel method and apparatus for controlled metering of a gasifier additive into a base constituent batch mixture so as to effect uniform mixing with the base constituent batch while enabling product expansion as the additive gasifies the base batch preparatory to dispensing of the mixed product.

Another object of the present invention is to provide a novel method and apparatus for preparing a product by the controlled metering of one or more additive constituents into a base constituent batch, and wherein the base batch is prepared in a mixing vessel having heating or cooling capability, the base batch being progressively discharged into a metering stage of a metering/mixing auger assembly so as to convey the base batch at a first metered rate to a mixing stage of the auger assembly at which one or more additives are metered into the base batch from an open trough and uniformly mixed as the mixing stage of the auger conveys the mixed product at a faster rate to a dispensing end of the auger assembly. The open trough and increased pitch mixing stage of the auger assembly accommodate expansion of the product when the additive is of the gasifying type.

In carrying out the present invention, a first constituent base batch of a product is prepared in a processing vessel, such as a mixing kettle having heating and/or cooling capability, and progressively discharged into the metering stage of a generally horizontally disposed metering/mixing auger assembly. The auger assembly includes a screw type auger defining a uniform pitch metering stage surrounded by a heating or cooling jacket so as to maintain the base batch at a desired temperature as it is received from the mixing vessel and conveyed to a mixing stage of the auger assembly. The auger mixing stage is defined by an increased pitch length of the auger which is exposed to a generally upstanding open trough that enables controlled metering of one or more additive constituents into the base batch for mixing therewith. The mixing stage of the auger conveys the mixture to a dispensing end at an increased speed so as to accommodate expansion of the mixed constituents during gasification. The metering-/mixing auger and trough assembly may be readily disassembled for cleaning.

Further objects, features and advantages of the present invention, together with the organization and manner of operation thereof, will become apparent from the following detailed description of the invention taken in conjunction with the accompanying drawings wherein like reference numerals designate like elements throughout the several views.

DETAILED DESCRIPTION

Figure 1:
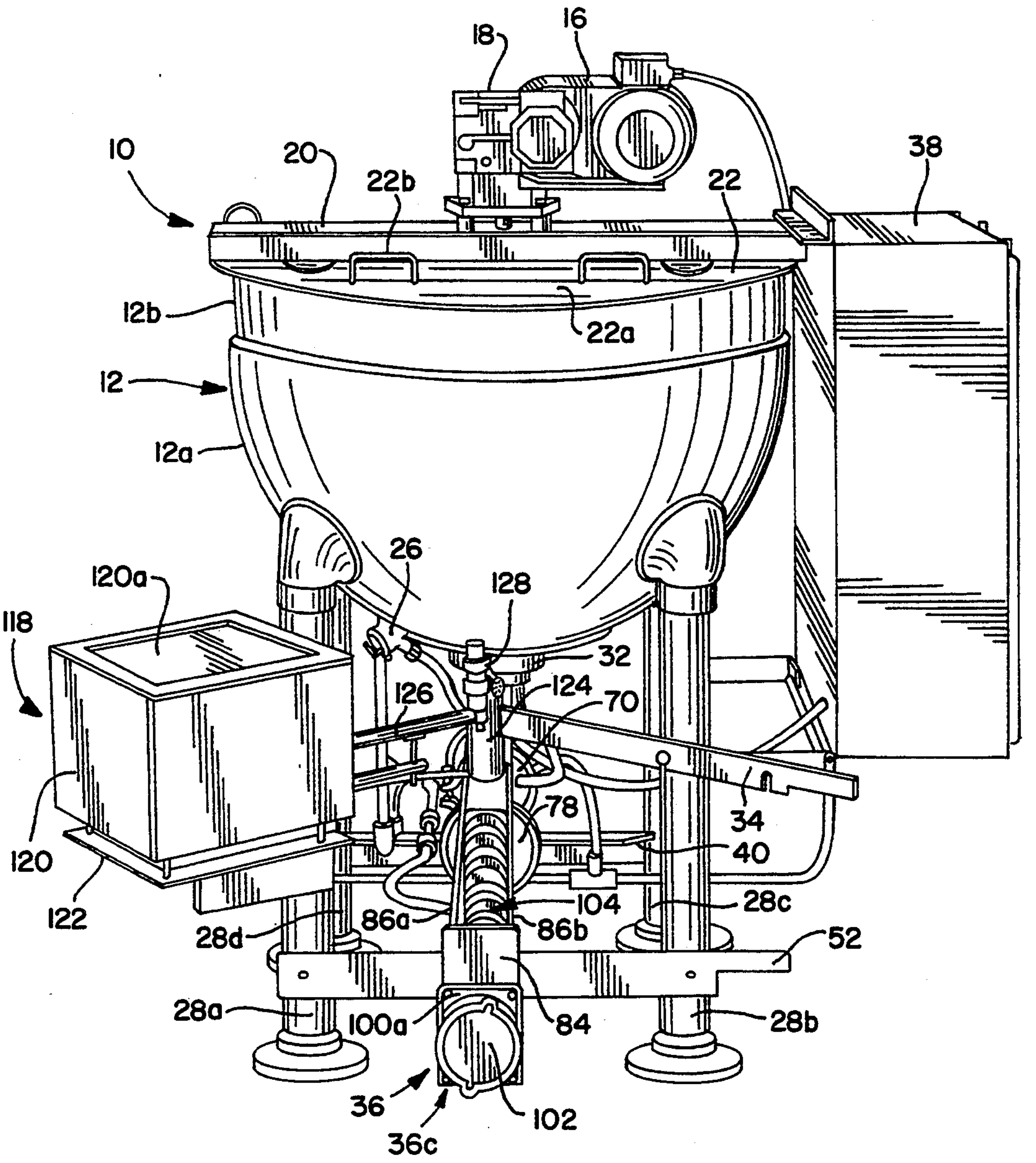
FIG. 1 is a perspective view of a product processing vessel and metering/mixing auger assembly constructed in accordance with the present invention.

Referring now to the drawings, and in particular to FIG. 1, a product processing system constructed in accordance with the present invention is indicated generally at 10. The processing system 10 includes a processing vessel or kettle 12 of generally known design for use in processing food products or other products where heating and/or cooling and mixing is required. In the illustrated embodiment, the vessel or kettle 12 may comprise a jacketed mixing kettle, such as commercially available from Groen/a Dover Industries Company, Elk Grove Village, Ill., that can be utilized to process products requiring heating or cooling and light to medium duty mixing.

Figure 2:
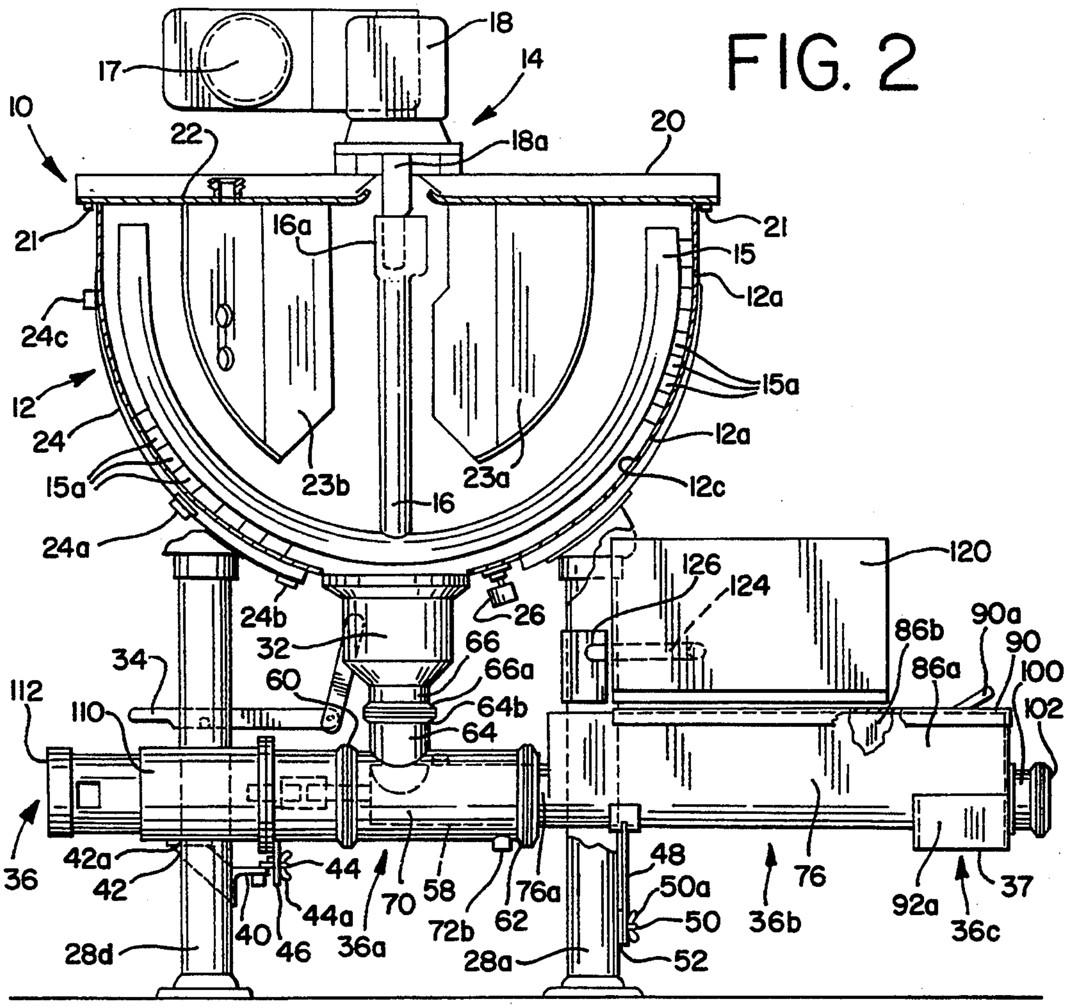
FIG. 2 is a side elevational view of the processing vessel and metering/mixing auger assembly illustrated in FIG. 1 but with portions broken away and some components angularly rotated from their positions shown in FIG. 1 for purposes of clarity.
Figure 4:
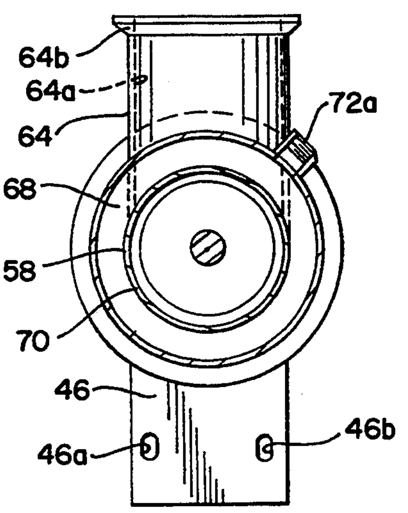
FIG. 4 is a transverse sectional view taken substantially along line 4—4 of FIG. 3.
Figure 5:
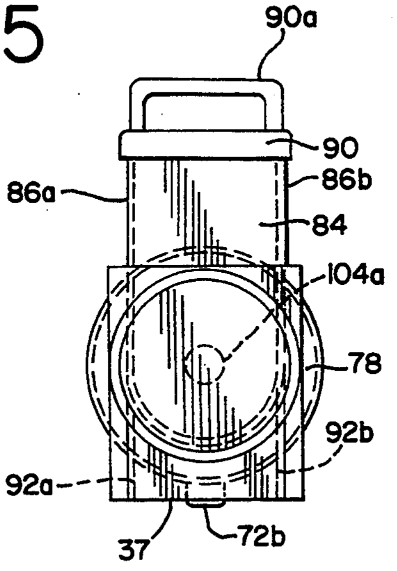
FIG. 5 is an end view taken substantially along line 5—5 of FIG. 3.

The vessel or kettle 12 is preferably made of stainless steel and has a jacketed hemispherical bottom portion 12*a* and an upper substantially cylindrical side wall portion 12*b* preferably formed integral with the upper periphery of the hemispherical bottom portion. Mixing means in the form of an agitator assembly 14 (FIG. 2) is supported within the kettle 12 and includes an arcuate shaped mixing or agitator blade 15 which is fixed to the lower end of a drive spindle 16 for rotation about a substantially vertical rotational axis coincident with the longitudinal center axis of the cylindrical upper wall portion 12*b* of the kettle. The agitator assembly includes a variable speed electric drive motor 17 and gear drive 18 which are supported on a transverse bridge or beam 20 supported on and releasably secured to the upper end of the kettle 12, as by bolts 21 (FIG. 2). The gear drive 18 is releasably coupled to the mixing blade drive spindle 16 through a drive shaft 18*a* and coupling 16*a* so as to enable selective rotation of the mixing blade 15. Preferably, a generally circular upper cover 22 is provided to close the upper end of the kettle, with a portion of the cover, such as a generally semicircular portion indicated at 22*a*, being hinged to the transverse bridge 20 and having handles 22*b* to facilitate opening for access to the interior of the kettle.

The mixing blade 15 is of known design and may be made of a tubular nickel alloy having removable finger-type nylon or suitable metallic scrapers 15*a* supported at its outer edge to scrape against an inner generally hemispherical surface 12*c* of the bottom kettle portion 12*a* and against at least a portion of the inner surface of the upper cylindrical wall portion 12*b*. A pair of mixing baffle plates, indicated at 23*a* and 23*b* in FIG. 2, are supported by the upper cover 22 so as to depend in generally vertical relation into the interior of the kettle 12. The baffle plates 23*a,b* are generally V-shape in transverse cross-section and assist mixing by directing the flow of product that is set in motion by the agitator or mixing blade 15. The scraper fingers 15*a* carry the product away from the heated or cooled kettle surface 12*c* so that the product being mixed is forced by the right-hand baffle plate 23*a* to move through the center of the kettle, past the left-hand baffle plate 23*b*, and back to the kettle wall. Preferably, one of the baffle plates 23*a,b* is perforated ,and fitted with a thermometer bracket which supports the probe of an indicating or control instrument operative to maintain the product being mixed at a desired temperature.

An outer generally hemispherical shaped jacket 24 is provided about the lower hemispherical wall portion 12*b* of the kettle to establish an internal fluid or steam chamber for receiving a heating or cooling medium. Connector couplings 24*a–c* on the jacket 24 facilitate connection of the internal fluid chamber to a heating or cooling source, such as steam or a liquid or gas coolant, provide for condensate draining, and connection to a safety valve, respectively. A temperature sensor 26 is mounted on the jacket 24 and extends into the kettle chamber in a manner to sense the temperature of the product within the kettle without interfering with scrapers 15*a*.

In the illustrated embodiment, the vessel or kettle 12 is supported at a convenient operating height by four upstanding support legs 28*a–d*. A circular discharge opening (not shown) is formed in the bottom of the hemispherical portion 12*a* of the kettle 12 and communicates with control valve means 32 of known design, such as a commercially available ball valve. The control valve 32 can be manually or automatically controlled through a control lever 34 to provide selective discharge of product from the kettle 12 into a discharge metering/mixing auger assembly, indicated generally at 36. As will be described, the auger assembly 36 has a metering stage 36*a* which is coupled to the outlet of the control valve 32 to receive product from the kettle. The metering stage of the auger assembly is operative to convey the product at a predetermined metered rate to a mixing stage 36*b* of the auger assembly at which one or more additive constituents may be introduced and mixed into the base batch or product constituent received by the mixing state from the kettle. The mixing stage 36*b* of the auger assembly 36 effects accelerated or increased movement of the mixed base and additive constituents to a discharge end 36*c* of the auger assembly where the mixed product is dispensed through a discharge opening 37 (FIG. 3) for further processing, such as sheeting, cutting and/or cooling, in subsequent operations.

A control panel 38 is supported adjacent the kettle 12 and houses electrical controls for the mixer drive motor 16 as well as other components to be hereinafter described. If desired, a programmed processor may be supported within the control panel 38 for carrying out automatic operation of a processing cycle after introducing initial base product constituents into the kettle for heating or cooling and mixing.

Figure 3:
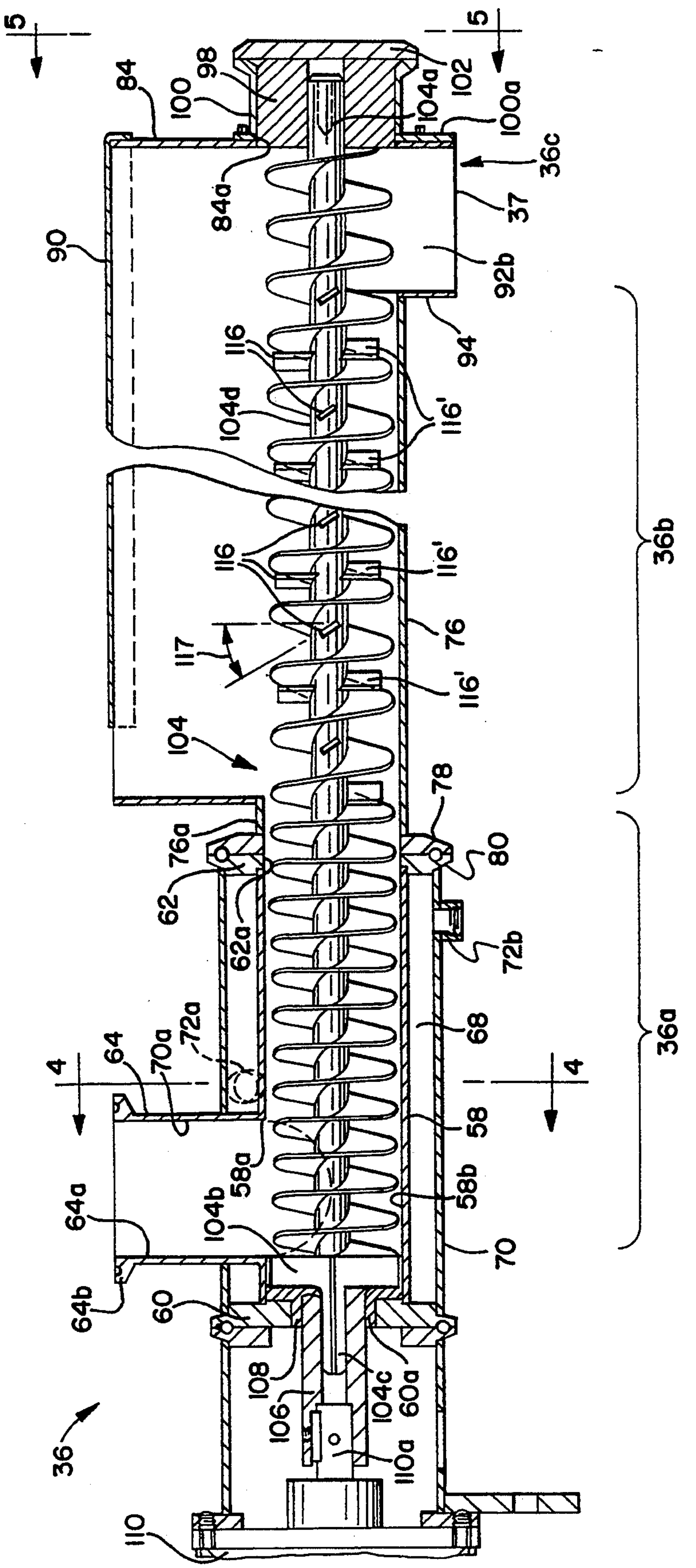
FIG. 3 is a fragmentary vertical sectional view taken substantially along the longitudinal axis of the metering-/mixing auger assembly of FIGS. 1 and 2.

Referring particularly to FIGS. 2 and 3, taken in conjunction with FIGS. 1–4 and 5, the discharge metering/mixing auger assembly 36 is supported by the upstanding support legs of the processing apparatus so as to lie in a generally horizontal orientation during normal operation. The auger assembly 36 is supported in a manner to enable easy release and disassembly from the kettle 12 without tools for cleaning and servicing. To this end, a horizontal transverse angle or bracket 40 is secured to and between the rearward support legs 28*c* and 28*d*. A pair of upwardly angled brackets, one of which is indicated at 42 in FIG. 2, support a horizontal support plate 42*a* on which the rearward end of the auger assembly is supported. A pair of threaded shafts, one of which is indicated at 44, are fixed generally centrally on the angle 40 and are adapted to extend through suitable elongated openings 46*a* and 46*b* (FIG. 4) in a plate 46 fixed to the bottom of the auger assembly 36. Wing nuts 44*a* releasably retain the plate 46 on shafts 44 and thereby retain the auger assembly longitudinally relative to the kettle 12 while enabling limited vertical pivoted movement of the metering/mixing auger assembly. The forward mixing stage portion 36*b* of the auger assembly is cradled in a vertically adjustable tilt bracket 48 supported by a threaded shaft 50 and wing nut 50*a* centrally of a cross bracket 52 fixed to the forward support legs 28*a* and 28*b*. In this manner, the auger assembly 36 can be readily removed from its supported position on the support plate 42*a* and bracket 48 without need for tools.

The metering stage 36*a* of the discharge metering-/mixing auger assembly 36 includes a cylindrical tubular housing 58 having its left-hand end secured to an annular connector plate 60 and its right-hand end fixed to an annular connector plate 62, as illustrated in FIG. 3. The connector plate 62 has a cylindrical bore 62*a* of a diameter substantially equal to the inner diameter of the tubular housing 58. A cylindrical input tube 64 of a diameter substantially equal to the diameter of the housing 58 is fixed transversely to housing 58 peripherally of an opening 58*a*. The upper end of the input tube housing 64 has an annular flange 64*b* formed thereon to facilitate connection of the input tube to a similar flange 66*a* formed on a reduced diameter tubular output 66 of the control valve 32, as by a suitable manually releasable ring clamp, when the auger assembly 36 is positioned as in FIG. 2.

In the illustrated embodiment, a steam chamber 68 is formed about the tubular housing 58 by an outer tubular sleeve or housing 70 having its opposite ends fixed in sealed relation to the connector plates 60 and 62 so that sleeve 70 is substantially coaxial with housing 58. The sleeve 70 has an opening 70*a* which receives the input tube 64 in sealed relation with sleeve 70 so as to establish the annular steam chamber 68. An inlet connector or nipple 72*a* is fixed to the outer sleeve 70 for connecting chamber 68 to a source of heat, such as steam or heated water, or to a coolant, depending on the product being prepared. A similar connector or nipple 72*b* is mounted on the sleeve 70 to enable return flow from chamber 68 to the heating or cooling source or to a reservoir or drain line.

The mixing stage 36*b* of the metering/mixing auger assembly 36 includes an elongated housing 76 having a cylindrical tubular left-hand end 76*a* fixed to an annular connector flange 78. The connector flange 78 is similar to and connected in coaxial relation with the connector flange 62 through a suitable manually releasable annular clamp (not shown in FIG. 3) so that the tubular end portion 76*a* of housing 76 is coaxial with housing 58. A suitable O-ring type seal 80 is interposed between the connector flanges 62 and 78.

The housing 76 has a semi-cylindrical lower wall portion having a longitudinal axis coincident with the longitudinal axis of housing 58 and extending between the connector flange 78 and a rectangular end plate 84 secured, as by welding, in normal relation to the right-hand end of housing 76. The end plate 84 has a circular opening 84*a* coaxial with the axis of the tubular end 76*a* of housing 76 and having a radius substantially equal to the radius of end 76*a*. The housing 76 has a pair of upstanding parallel sidewalls 86*a* and 86*b* which may be formed integral with the lower semi-cylindrical wall portion and which are connected at their opposite ends to the end plate 84 and an opposite end plate 88 so as to define a rectangular trough having a lateral width substantially equal to twice the radius of the lower semi-cylindrical wall and having an open upper end. A rectangular cover 90 is adapted to rest on the upper marginal edges of the sidewalls 86*a,b* for closing at least a portion of the upper open end of the trough. Preferably, a cover handle 90*a* is provided to facilitate manipulation of the cover.

The discharge end 36*c* of the metering/mixing auger assembly 36 is formed at the right-hand end of the trough defined by the housing 76. The discharge opening 37 is defined by a pair of side plates 92*a* and 92*b* which are spaced apart a distance equal to twice the radius of the lower semi-cylindrical wall of housing 76 and have their upper marginal edges connected to housing 76. The sidewalls 92*a,b* are connected at their forward edges to the end plate 84 and have a transverse cross plate 94 secured to their rearward edges and to the housing 76 so as to establish the rectangular discharge opening 37.

An annular bearing 98, such as a suitable bushing-/bearing, is releasably supported in coaxial relation with the longitudinal axis of the housings 58 and 76 by an annular sleeve 100. The sleeve 100 is fixed to a generally rectangular mounting plate 100 which in turn is mounted on the end plate 84. A circular end cap 102 is releasably mounted in sealing relation to an end flange on sleeve 100 by a conventional manually releasable O-clamp. The bearing 98 rotatably supports an end 104*a* of an elongated screw-type auger 104 which extends coaxially along the length of the connected housings 58 and 76 and defines product conveying means. The end of the auger 104 opposite the end 104*a* has a cylindrical hub 104*b* having a square axial drive shaft 104*c* formed thereon. The drive shaft 104*c* is received within a square longitudinal bore in a cylindrical drive coupling 106 rotatably supported in a bearing 108 which in turn is supported within an axial opening 60*a* in the end plate 60. The drive coupling 106 is also coupled to a drive shaft 110*a* which extends from a gear box 110 having a suitable electric drive motor 112 connected thereto such that energizing the drive motor effects clockwise rotation of the auger, as considered from the forward end of the auger as in FIG. 5.

Referring to FIG. 3, the auger 104 has a cylindrical outer envelope of substantially uniform diameter throughout its length. The portion of the auger 104 disposed within the housing 58 defines the auger metering stage 36*a* and is close fitting to the inner diameter of housing 58. The flute or screw of the auger metering stage is selected to provide a smooth controlled product conveying rate for product received from the kettle 12. By controlling the rotational speed of the auger for a given screw pitch, as through electronically controlling the drive motor 112 or providing a mechanical variable speed control, the product flow or conveying rate can be precisely metered and calibrated for different production rates.

The portion of the auger 104 which extends longitudinally of the mixing stage 36*b* of the metering/mixing auger assembly 36 and is exposed to the open trough defined between the upstanding sidewalls 86*a* and 86*b* has a flute or screw pitch approximately 33% greater than the pitch of the metering stage portion of the auger. In this manner, the product is conveyed at a faster rate through the mixing stage as an additive constituent is added to the product received from the metering stage 36*a*. The portion of the auger 104 which extends through the open trough portion of the mixing stage 36*b* preferably has a plurality of mixer bars or blades 116 and 116' fixed to an axial shaft portion 104*d* of the auger so that the mixer bars extend radially a distance less than the outer dimension of the auger. In the illustrated embodiment, the mixer bars are generally rectangular and are angularly inclined relative to planes normal to the rotational axis of the auger and intersecting the leading edges of the mixer bars. The mixer bars or blades 116 are preferably inclined at an angle 117 of approximately 30° to a plane normal to the auger axis, while the mixer bars 116' are angularly inclined in an opposite angular direction of approximately 30° relative to planes normal to the auger axis and intersecting the leading edges of mixer bars 116'.

With the discharge metering/mixing auger assembly 36 as thus described, it will be appreciated the open trough of the metering stage 36*b* enables one or more additive constituents to be metered into the product received from the mixing stage 36*a*. In the illustrated embodiment, feeder means in the form of a supply feeder, indicated generally at 118 in FIG. 1, is provided to effect metered flow of one or more additives into the trough. The feeder 118 includes a generally rectangular open top housing 120 having an internal flexible vinyl hopper 120*a*. The flexible hopper has an upper open end into which one or more additive constituents, such as baking soda, may be introduced. The feeder 118 is of known design, such as commercially available from AccuRate, Inc., as its model 302 feeder. The housing 120 is supported on a horizontal base platform 122 which in turn is supported on a swing arm pivotally attached to support leg 28*a* to enable selective positioning of the feeder housing. A generally horizontal auger type feed tube 124 extends outwardly from the feeder housing 120 and communicated with the interior of the flexible hopper 120*a.* The outer end of the feed tube 124 has a vertical discharge tube 126 mounted thereon having a lower discharge orifice operative to overlie the open trough and discharge material from the hopper 120*a* into the trough upon vibratory distortion of the flexible hopper. An air nozzle, such as indicated at 128 if FIG. 1, is preferably mounted on an upper end of the discharge tube 126 to effect low pressure air flow into the discharge tube and prevent steam from passing into the feed tube and product within the hopper 120*a.* The cover 90 has a length less than the longitudinal length of the hopper to accommodate the discharge end of the discharge tube 126 while the cover is disposed on the upper end of the hopper. Other types of feeders may be employed to meter additive product or constituents into the trough of the mixing stage 36*b* if desired.

In operation, a plurality of items to be mixed, such as food items to be mixed to create a first constituent, are mixed and cooked in the steam jacketed agitator kettle 12. When a desired mixing and product temperature is reached, the outlet valve 32 is opened, either manually or automatically, to allow the cooked product to flow into the metering stage 36*a* of the metering/mixing auger assembly 36. Simultaneously with discharge of product from the kettle to the auger assembly, the motorized auger 104 is caused to rotate in a direction and speed to obtain a desired flow rate or product metering for the particular product being produced.

As the product is conveyed by the metering portion of the auger to the auger mixing portion within the open trough between walls 86*a,b,* the increased pitch of the auger mixing portion increases the conveying rate of the product toward the discharge opening 37. Within the mixing stage 36*b* of the metering/mixing auger assembly, one or more additives, such as baking soda, may be precisely metered by the feeder 118 into the product received from the metering stage. The discharge tube 126 is positioned to meter the additives into the trough adjacent the left-hand end of the auger portion within the mixing stage 36*b,* as considered in FIG. 3, so that the mixer bars or blades 116 and 116′ effect thorough mixing of the additives into the main product received from the metering stage 36*a* as the admixed product is conveyed to the discharge outlet 37 for further processing, such as sheeting, cutting and cooling and the like.

Where the constituent or additive metered into the mixing trough from feeder 118 is of the type which effects gasification of the product received from the metering stage 36*a,* the trough accommodates an increase in product volume as the reaction proceeds. For example, in many food products, baking soda is added to an initial constituent mix which results in carbon dioxide being entrained within the product to provide a desired density characteristic. The trough of the mixing stage 36*b* accommodates the increased product volume, while the increased pitch of the auger within the mixing stage causes the product to be conveyed faster through the mixing stage, thereby further accommodating increased product volume and effecting discharge from the outlet 37 before the product cools down.

It will be appreciated that the control panel 38 may house control means operatively associated with the mixing vessel blade drive motor 16, the control valve 32, and the auger drive motor 112 to effect automatic control of product discharge from the kettle 12 and through the metering/mixing auger assembly 36, while also controlling metering of an additive constituent from the feeder 118 into the product. The control may also control the temperature within the metering stage 36*a* by controlling the flow of a heating medium, such as steam, through the chamber 68 peripherally of the metering stage housing 58.

Thus, in accordance with the present invention, a product processing system is provided which enables precise preparation of a first constituent within a temperature controlled mixing and cooking kettle, and controlled discharge from the mixing kettle to a metering/mixing auger assembly wherein the product is conveyed at a first precisely metered flow rate through a heated metering stage to a mixing stage in which one or more additive constituents can be metered into the product through a trough while the auger simultaneously increases the conveying rate of the admixed product toward a discharge outlet so as to accommodate an increase in product volume in response to the additive constituents. The metering/mixing auger assembly in accordance with the invention provides for ease of assembly and disassembly for cleaning and servicing by a single operator without need for tools.

While a preferred embodiment of the invention has been illustrated and described, it will be understood to those skilled in the art that changes and modifications may be made therein without departing from the invention in its broader aspects. Various features of the invention are defined in the following claims.

What is claimed is:

1. Processing apparatus comprising, in combination, mixing kettle means defining an internal chamber for receiving one or more mixable products and including means for mixing said products within said chamber, said kettle means having a discharge opening, control valve means cooperative with said kettle means to enable selective discharge of product from said discharge opening, and metering/mixing auger means operatively associated with said kettle and including housing means defining a metering stage adapted to receive product discharged from said discharge opening, said housing means further defining a mixing stage longitudinally aligned with and downstream from said metering stage, auger means disposed within housing means and extending substantially the longitudinal lengths of said metering and mixing stages, said auger means being operative to convey product from said discharge opening through said metering and mixing stages, said housing means defining a trough communicating with said auger means disposed within said mixing stage to enable introduction of an additive into product conveyed through said mixing stage, said auger means being operative to admix said additive and product within said mixing stage and convey the mixture to an outlet in said mixing stage at a greater rate then the rate the product is conveyed by said auger means through said metering stage, whereby to accommodate increased product volume within said mixing stage without inhibiting the rate of product conveyance through said metering stage.

2. Processing apparatus as defined in claim 1 including feeder means operative to dispense one or more additives into said trough.

3. Processing apparatus as defined in claim 1 including means supporting said metering/mixing auger means for releasable connection to said control valve means.

4. Processing apparatus as defined in claim 1 wherein said housing means includes a generally cylindrical tubular housing defining said metering stage, said housing means further establishing a substantially annular chamber about the periphery of said tubular housing enabling introduction of a heating or cooling medium into said chamber to effect selective heating or cooling of product conveyed through said metering stage.

5. Processing apparatus as defined in claim 1 wherein said trough has an upwardly facing opening enabling introduction of an additive into said trough.

6. Processing apparatus as defined in claim 1 wherein said metering and mixing stages are formed by discrete housings releasably connected in axially aligned relation.

7. Cooking apparatus comprising, in combination, a cooking vessel operative to receive and heat a first product constituent and having a discharge opening enabling discharge of said first constituent from the vessel, a feeder auger assembly including a generally horizontally disposed elongated auger defining a metering stage operative to progressively receive said first constituent from said discharge opening and convey it at a first rate along said auger during rotation thereof, said auger defining a mixing stage operative to progressively receive said first constituent from said metering stage and convey it along said auger at a second rate greater than said first rate to a dispensing end of said auger assembly, said auger assembly having a trough in open communication with said mixing stage of said auger, means for adding a second product constituent to said first constituent at a metered rate as said first constituent is conveyed along said mixing stage of said auger so as to effect mixing of said first and second constituents, and means for effecting selective rotation of said auger in a direction to convey said product constituents to said dispensing end.

8. Cooking apparatus as defined in claim 7 wherein said auger comprises a feed auger having a helical screw formed along its length, said helical screw disposed within said mixing stage having greater pitch than the pitch of said screw within said metering stage.

9. Cooking apparatus as defined in claim 8 wherein said auger within said metering stage has a constant helical screw pitch along its length.

10. Cooking apparatus as defined in claim 7 wherein said auger has a plurality of mixing vanes carried along the length thereof within said mixing stage to effect intermixing of said second constituent into said first constituent.

11. Cooking apparatus as defined in claim 10 wherein said mixing vanes are generally radial to the rotational axis of said auger.

12. Cooking apparatus as defined in claim 11 wherein said mixing vanes are angularly inclined relative to planes transverse to said auger rotational axis.

13. Processing apparatus comprising, in combination, processing vessel means defining an internal chamber for receiving one or more products for processing and having a discharge opening, housing means operatively associated with said vessel and defining a metering stage for receiving product discharged from said discharge opening, said housing means further defining a mixing stage downstream from said metering stage, auger means disposed within housing means for conveying product from said discharge opening through said metering and mixing stages, said housing means defining a trough communicating with said auger means disposed within said mixing stage to enable introduction of at least one additive into product conveyed through said mixing stage, said auger means being operative to admix said additive and product within said mixing stage and convey the mixture to an outlet in said mixing stage at a greater rate than the rate the product is conveyed by said auger means through said metering stage, whereby to accommodate increased product volume within said mixing stage without inhibiting the rate of product conveyance through said metering stage.

14. Processing apparatus as defined in claim 13 including feeder means operative to dispense one or more additives into said trough.

15. Processing apparatus as defined in claim 13 including control valve means cooperative with said vessel to enable selective discharge of product from said discharge opening, and means supporting said housing means for releasable connection to said control valve means.

16. Processing apparatus as defined in claim 13 wherein said mixing stage is longitudinally aligned with said metering stage.

17. Processing apparatus as defined in claim 16 wherein said auger means comprises a mixing auger extending substantially the longitudinal lengths of said metering and mixing stages.

18. Processing apparatus as defined in claim 13 wherein said housing means includes a generally cylindrical tubular housing defining said metering stage, said housing means further establishing a substantially annular chamber about the periphery of said tubular housing enabling introduction of a heating or cooling medium into said chamber to effect selective heating or cooling of product conveyed through said metering stage.

19. Processing apparatus as defined in claim 13 wherein said trough has an upwardly facing opening enabling introduction of an additive into said trough.

20. Processing apparatus as defined in claim 13 wherein said auger means within said metering stage has a constant helical screw pitch along its length.

21. Processing apparatus as defined in claim 13 wherein said auger means has a plurality of mixing vanes carried along the length thereof within said mixing stage to effect intermixing of said additive into product conveyed through said mixing stage.

22. Processing apparatus as defined in claim 21 wherein said mixing vanes are angularly inclined relative to planes transverse to a rotational axis of said auger means.

23. Processing apparatus comprising, in combination, processing vessel means defining an internal chamber for receiving one or more mixable products and including means for processing said products within said chamber, said vessel means having a discharge opening, control valve means for enabling selective discharge of product from said discharge opening, and metering-/mixing means operatively associated with said vessel and including housing means defining a metering stage adapted to receive product discharged from said discharge opening, said housing means further defining a mixing stage downstream from said metering stage, auger means disposed within housing means and extending substantially the longitudinal lengths of said metering and mixing stages, said auger means being operative to convey product from said discharge opening through said metering and mixing stages, said housing means defining at least one trough communicating with said auger means within said mixing stage to enable introduction of at least one additive into product conveyed through said mixing stage, said auger means being operative to admix said additive and product within said mixing stage and convey the mixture to an outlet in said mixing stage in a manner to accommodate increased product volume within said mixing stage without inhibiting the rate of product conveyance through said metering stage.

24. Processing apparatus as defined in claim 23 including feeder means operative to dispense one or more additives into said trough.

25. Processing apparatus as defined in claim 23 including means supporting said housing means for releasable connection to said control valve means.

26. Processing apparatus as defined in claim 23 wherein said auger means comprises a feed auger having a helical screw along its length, said helical screw disposed within said mixing stage having greater pitch than the pitch of said screw within said metering stage so as to convey the mixture to said mixing stage outlet at a greater rate than the rate the product is conveyed through said metering stage.

27. Processing apparatus as defined in claim 26 wherein said feed auger within said metering stage has a constant helical screw pitch along its length.

28. Processing apparatus as defined in claim 26 wherein said auger has a plurality of mixing vanes carried along the length thereof within said mixing stage to effect intermixing of said additive into product conveyed through said mixing stage.

29. Processing apparatus as defined in claim 26 wherein said mixing vanes are generally radial to a rotational axis of said feed auger.

* * * * *